(12) United States Patent
Olaison et al.

(10) Patent No.: US 10,618,473 B2
(45) Date of Patent: Apr. 14, 2020

(54) LOAD CARRIER FOR A VEHICLE

(71) Applicant: Thule Sweden AB, Hillerstorp (SE)

(72) Inventors: Hannes Olaison, Jönköping (SE); Urban Stark, Vaggeryd (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/629,325

(22) Filed: Jun. 21, 2017

(65) Prior Publication Data
US 2018/0001830 A1    Jan. 4, 2018

(30) Foreign Application Priority Data

Jul. 4, 2016 (EP) ................................. 16177704

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .................................. B60R 9/06; B60R 9/10
USPC ................................ 224/504, 537, 495, 924
See application file for complete search history.

(56) References Cited

U.S. PATENT DOCUMENTS

| | | | | |
|---|---|---|---|---|
| 5,056,699 A | * | 10/1991 | Newbold | B60R 9/06 224/314 |
| 5,118,020 A | * | 6/1992 | Piretti | B60R 9/10 224/314 |
| 5,135,145 A | * | 8/1992 | Hannes | B60R 9/06 224/314 |
| 5,195,670 A | * | 3/1993 | Piretti | B60R 9/06 16/324 |
| 5,363,996 A | * | 11/1994 | Raaber | B60R 9/06 224/314 |
| 5,690,260 A | * | 11/1997 | Aikins | B60R 9/06 224/504 |
| 5,996,957 A | * | 12/1999 | Kurtz | A47G 23/0225 248/231.21 |

(Continued)

FOREIGN PATENT DOCUMENTS

| | | |
|---|---|---|
| DE | 102009016534 A1 | 10/2010 |
| EP | 2017131 A2 | 1/2009 |

(Continued)

OTHER PUBLICATIONS

European Search Report for European Appl. No. 16177704.0, European Patent Office, Munich, Germany, dated Jan. 18, 2017, 3 pages.

*Primary Examiner* — Nathan J Newhouse
*Assistant Examiner* — Lester L Vanterpool
(74) *Attorney, Agent, or Firm* — Sterne, Kessler, Goldstein & Fox P.L.L.C.

(57) ABSTRACT

A load carrier for a vehicle adapted to be mounted on the vehicle for transporting a load. The load carrier includes at least one pivot arm pivotably connected about a pivot axis to a base frame at a pivot connection portion. The at least one pivot arm is pivotable between an operative position and a storage position. The load carrier is adapted to at least partly carry the load when the at least one pivot arm is positioned in the operative position. The load carrier can include a locking mechanism for securing the at least one pivot arm in the operative position and in the storage position.

18 Claims, 8 Drawing Sheets

(56) References Cited

U.S. PATENT DOCUMENTS

| | | | | |
|---|---|---|---|---|
| 6,286,738 | B1* | 9/2001 | Robins | B60R 9/06 224/314 |
| 6,422,443 | B1* | 7/2002 | Erickson | B60R 9/06 224/492 |
| 7,815,083 | B2* | 10/2010 | Clausen | B60R 9/10 224/497 |
| 8,028,878 | B1* | 10/2011 | Pedrini | B60R 9/06 224/495 |
| 9,254,790 | B2* | 2/2016 | Dreger | B60R 9/10 |
| 9,358,933 | B2* | 6/2016 | Phillips | B60R 9/10 |
| 9,802,549 | B1* | 10/2017 | Shen | B60R 9/06 |
| 2002/0117524 | A1* | 8/2002 | Jeong | B60R 9/06 224/314 |
| 2005/0061842 | A1* | 3/2005 | Tsai | B60R 9/06 224/501 |
| 2005/0133555 | A1* | 6/2005 | Bove | B60R 9/06 224/324 |
| 2008/0099522 | A1 | 5/2008 | Clausen et al. | |
| 2015/0076200 | A1* | 3/2015 | Pedrini | B60R 9/10 224/570 |
| 2015/0083770 | A1* | 3/2015 | Ziola | B60R 9/06 224/501 |

FOREIGN PATENT DOCUMENTS

| | | | |
|---|---|---|---|
| EP | 2703224 B1 | 4/2015 | |
| WO | WO 2006/004519 A1 | 1/2006 | |

\* cited by examiner

LOAD CARRIER FOR A VEHICLE

CROSS REFERENCE TO RELATED APPLICATION

This application claims foreign priority to EP Application No. 16177704.0, filed Jul. 4, 2016, which is hereby incorporated herein in its entirety by reference.

TECHNICAL FIELD

A load carrier, such as a bike carrier, for a vehicle and adapted to be mounted on a towing bar of the vehicle. The load carrier comprises load receiving sections connected together via a base frame and a locking mechanism for securing the load receiving sections in a storage position and/or in an operating position.

BACKGROUND

Load carriers, e.g. sports equipment carriers, e.g. bicycle carriers, also referred to as bike carriers, can usually be mounted to a towing bar arranged at the rear of a vehicle. Load carriers serve their purpose when in use, but can be cumbersome when stored, e.g. in a garage, or when moved from a storage position to an operating position on the vehicle.

The European Patent No. EP 2,703,224 B1, Thule Sweden AB, discloses a load carrier for carrying a bicycle. The load carrier is foldable, with two pivotable load receiving portions pivotally connected to a center piece. A license plate holder is positioned on the center piece. The foldable, or pivotable, load carrier can be made less bulky, permitting it to be tucked away and stored in an easy manner.

A foldable load carrier may comprise a hook securing each pivotable load receiving portion in a vertical folded position for storage and in a horizontal unfolded position for use. Each hook can be operated by a release lever. In order to unfold the load receiving sections, a user has to press the release lever located near the rotation center of the load receiving sections, which is hard to reach since it is located between the folded load receiving sections. At the same time the load receiving sections have to be pushed in opposite direction of the unfolding direction in order to allow the hook to disengage. A two hand operation is thus required to successfully unfold each load receiving section.

SUMMARY

It is an object of the present invention to provide for an easy to use load carrier, which improves the operation of the load carrier and the comfort for the user. The objects are at least partly met by a load carrier for a vehicle, adapted to be mounted on the vehicle for transporting a load. The load carrier comprises at least one pivot arm, which at least one pivot arm is pivotably connected about a pivot axis to a base frame at a pivot connection portion. The pivot arm is pivotable between an operative position and a storage position. The load carrier is adapted to at least partly carry the load when the at least one pivot arm is positioned in the operative position.

The load carrier comprises a locking mechanism for securing the at least one pivot arm in the operative position and/or in the storage position. The locking mechanism comprises a first locking member and a second locking member co-axially arranged with the pivot axis. The first and the second locking members are pivotable in relation to each other around the pivot axis when the at least one pivot arm pivots about the pivot axis, such that a friction force and/or a mechanical force between the first locking member and the second locking member secures the at least one pivot arm in the operative position and/or in the storage position. Thereby, a user only has to apply a force to the pivot arm, which overcomes the friction force and/or the mechanical force, in order to unfold the load carrier. This can be performed using only one hand. Hence, the user friendliness of the load carrier is increased. The friction force and/or the mechanical force may further secure the pivot arms in an operating position, and thereby prevents the load carrier from rattling when a vehicle travels on a bumpy road. This improves user experience of the load carrier.

According to an aspect, the first locking member or the second locking member is fixed with respect to and pivots synchronously with the at least one pivot arm. The other of the first and the second locking member is fixed with respect to the base frame. Thereby, the first and the second locking members are pivotable in relation to each other around the pivot axis when the at least one pivot arm pivots about the pivot axis.

According to an aspect, the first and the second locking members are biased towards each other by biasing means. The mechanical force applied by the biasing means may increase the friction force between the first and the second locking member. The friction between the locking members secures the at least one pivot arm to the base frame in the operative position and/or in the storage position. Since the pivot arm is secured by the friction created between the locking members, the weight of the locking mechanism can be reduced in comparison to the locking mechanism comprising hooks and levers known from prior art.

According to an aspect, the first locking member comprises at least one protrusion and the second locking member comprises at least one groove. The shape of the at least one protrusion and the at least one groove correspond, such that the at least one protrusion can be received by the at least one groove.

According to an aspect, the second locking member comprises a first groove arranged to receive the at least one protrusion when the at least one pivot arm is in the operative position. The second locking member further comprises a second groove arranged to receive the protrusion when the at least one pivot arm is in the storage position. Thereby, the force required to move the at least one pivot arm from the operating position or the storage position is further increased.

According to an aspect, the first and the second locking member may be arranged adjacent to each other in an axial direction.

According to an aspect, the locking mechanism may comprise a biasing means. The biasing means is arranged to bias the first and the second locking members towards each other in the axial direction.

According to an aspect, each of the first and the second locking members may comprise a surface perpendicular to the pivot axis. The at least one protrusion may protrude from the surface of the first locking member and the at least two grooves may be arranged on the surface of the second locking member.

According to a second aspect, the second locking member may be drum shaped. The first locking member may be rotatably arranged inside the second locking member and the first and second locking members may be biased towards each other in a radial direction.

According to a second aspect, the first locking member may comprise a flexible main body having a cylindrical shape. The at least two grooves may be arranged on an inner circumferential surface of the second locking member and the at least one protrusion is arranged on an outer circumferential surface of the first locking member.

According to a second aspect, the flexible main body of the first locking member may have a larger dimension than the inner dimension of the second locking member in the radial direction, such that the first locking member acts as a torsional spring biasing the first locking member towards the second locking member.

According to a second aspect, the first locking member may comprise a curved arm extending from the main body of the first locking member in a circumferential direction of the first locking member. The curved arm may biasedly abut the inner circumferential surface of the second locking member. The protrusion may protrude from a free end of the curved arm. The dimension of the curved arm may be chosen such that the curved arm is pretensionally arranged within the second locking member. Thereby the curved arm of the first locking member acts as a torsional spring biasing the first locking member towards the second locking member.

According to a second aspect, the second locking member may be a drum shaped portion of the base frame or the at least one pivot arm.

The second aspect of embodiments has the advantage that the space required for the locking mechanism in an axial direction of the load carrier is reduced. Furthermore, the number of parts required for assembling the locking mechanism is reduced which saves assembly time and thereby may reduce the manufacturing costs.

According to an aspect herein, the first and second locking members may comprise fixation means adapted to prevent pivoting of the locking members in relation to the base frame and/or the pivot arm which the first and the second locking members are fixed to. This ensures that the first and second locking members pivot with regards to each other and not with regards to the pivot arm or the base frame which they are fixed to, when the pivot arm pivots with regards to the base frame.

According to the first and/or the second aspect herein, the first and the second pivot axis may be formed by separate pivot axles or by an axle formed by the base frame. The first and the second locking members may be formed as sleeves covering the pivot axis.

According to the first and/or the second aspect herein, the at least one protrusion and the at least two grooves may comprise corresponding inclined surfaces. The inclination allows the at least one protrusion to slide out of the grooves when an external force is applied to the at least one pivot arm in order to move the pivot arm from and/or to the storage position to and/or from the operative position. By selecting the appropriate inclination, the force required to force the protrusion out of the groove can be adapted to the specific force required to securely hold the at least one pivot arm in the storage position or in the operative position but allowing a user to easily operate the pivot arm from the storage position or the operative position when desired.

According to the first and/or the second aspect herein, the base frame may be arranged on a sub frame. The sub frame may comprise a vehicle coupling arrangement for connecting the load carrier to the vehicle.

BRIEF DESCRIPTION OF THE DRAWINGS

Non-limiting embodiments will be described in greater detail with reference to the accompanying figures in which.

DETAILED DESCRIPTION

Figure 1:
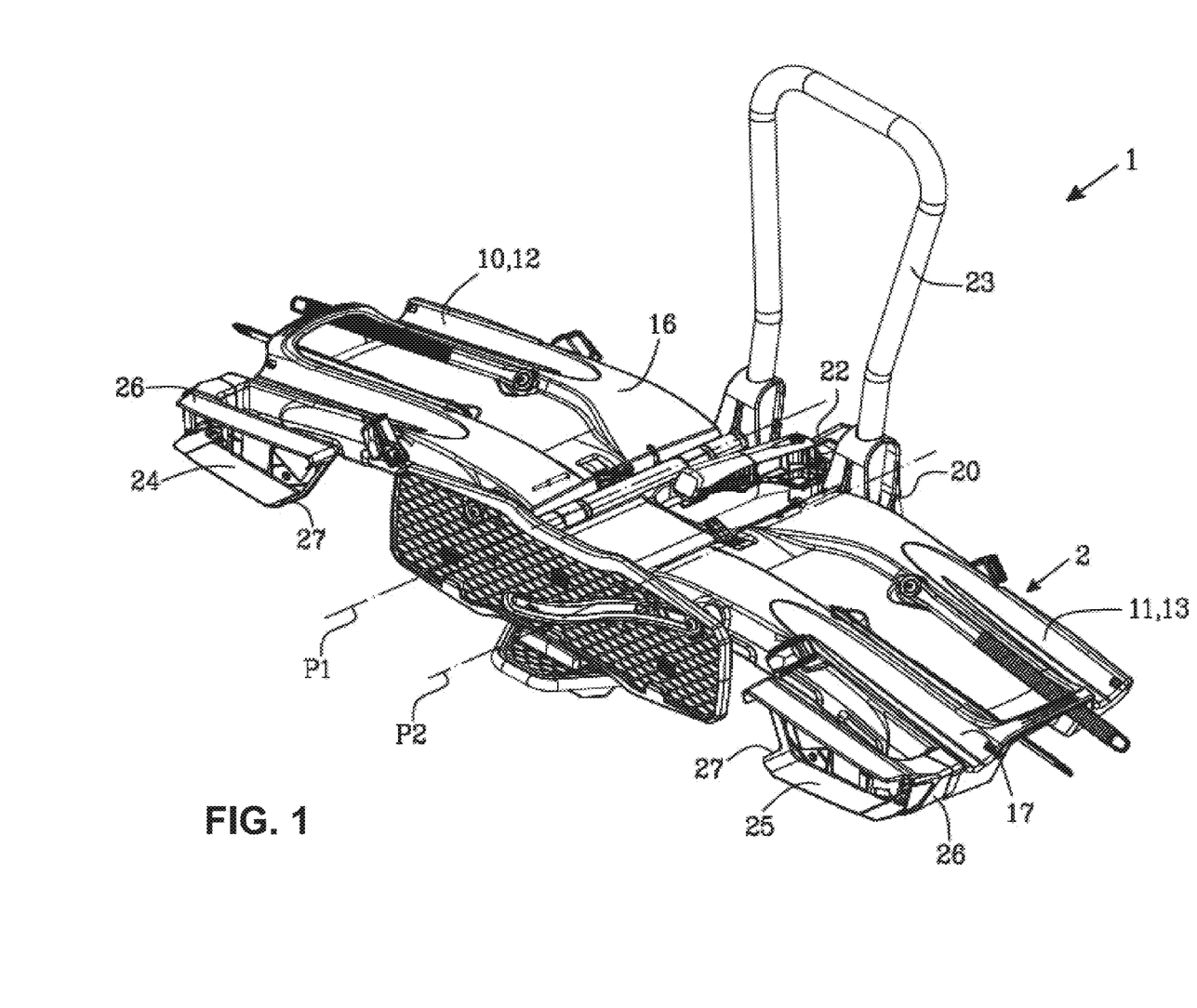
FIG. 1 shows a load carrier in the form of a bike carrier positioned in an operative position, or carrier position, ready to receive a load.

FIG. 1 shows a load carrier 1 for a vehicle (not shown) adapted to be attached to a towing bar of the vehicle. The load carrier 1 is in the shown embodiments a bike carrier 2, in this case adapted to carry two bikes. Instead of carrying bikes, the load carrier 1 could carry luggage, sports equipment such as surfboards, skies, or any other item usable to man.

The load carrier 1 can be positioned in a carrier position, also referred to as an operative position, as shown in FIG. 1 in which the load carrier 1 can receive and carry an item for transportation, and a storage position, also referred to as an idle position, in which the load carrier 1 can be put away for storage. At least one part of the load carrier 1 is foldable; it can be pivoted, between the operative position and the storage position. In the storage position, the load carrier could possibly be transported on the towing hook of the vehicle but it cannot be used for transporting items, at least not as intended and not to the same extent as when being in the operative position.

In the following, the bike carrier 2 will be described in greater detail with reference to the accompanying figures. FIG. 1 is a view in perspective of the bike carrier 2. The bike carrier 2 comprises a first and a second load receiving section 10, 11, each comprising a load receiving surface 12, 13. The first and the second load receiving sections 10, 11 are pivotally mounted to a base frame 40 which in turn is mounted to a frame member 20. The base frame 40 may e.g. be assembled by a plurality of pieces or may be a single center piece. The frame member 20 comprises a towing bar coupling 22 adapted to be mounted to the towing bar of the vehicle. The first and the second load receiving sections 10, 11 are adapted to pivot about a first and a second pivot axis P1, P2 respectively; indicated with dashed lines in FIG. 1 and FIG. 2. The towing bar coupling 22 is of a standard type comprising a socket adapted to receive and connect to a ball of the towing bar of the vehicle, to form a ball and socket joint.

In FIG. 1, the first and the second load receiving sections 10, 11 are arranged substantially aligned in a side-by side manner on either side of the base frame 40. The frame member 20 further comprises a U-formed bar 23 to which one or more bikes can be coupled, optionally via securing members such as lines, attachment arms or the like, for providing support and stability during transportation. A bike can thus be positioned on the bike carrier 2 with one wheel on each load receiving section 10, 11 and then additionally be supported by being connected to the U formed bar 23.

The wheels of the bike may further be attached to the load receiving sections 10, 11, e.g. using straps.

A first and a second rear light socket 24, 25 may be arranged on the first and the second load receiving section respectively of the bike carrier 2, and powered by the electrical system of the vehicle via e.g. a cord. The first and the second rear light sockets 24, 25 each comprises a proximal end 26 and a distal end 27, and is attached to the respective load receiving sections 10, 11 at the proximal end 26. The first and the second rear light sockets 24, 25 extend substantially parallel with the extension of the first and the second load receiving sections 10, 11. The first and the second rear light sockets 24, 25 are further separated a distance from the first and the second load receiving sections 10, 11 of about 1-10 cm, advantageously 2-7 cm, or an appropriate distance adapted for a license plate holder and an attached license plate (not shown) to fit there between, when being positioned in the storage position.

The first and the second load receiving sections 10, 11 may each comprise a first and a second housing 16, 17, providing the first and the second load receiving sections 10, 11 with protection from the ambient environment, such as dirt, rain, grabble etc. A housing can also be useful for providing rigidity to internal pivot arms, which will be described in greater detail below. The first and the second housing 16, 17 also provide an aesthetic pleasing look to the bike carrier 2. The first and the second housing 16, 17 can be formed by a plastic material such as polypropylene, polyethylene, acrylonitrile butadiene styrene (ABS), polyurethane, or the like, or mixtures thereof. Aluminum is also a suitable material.

Figure 2:
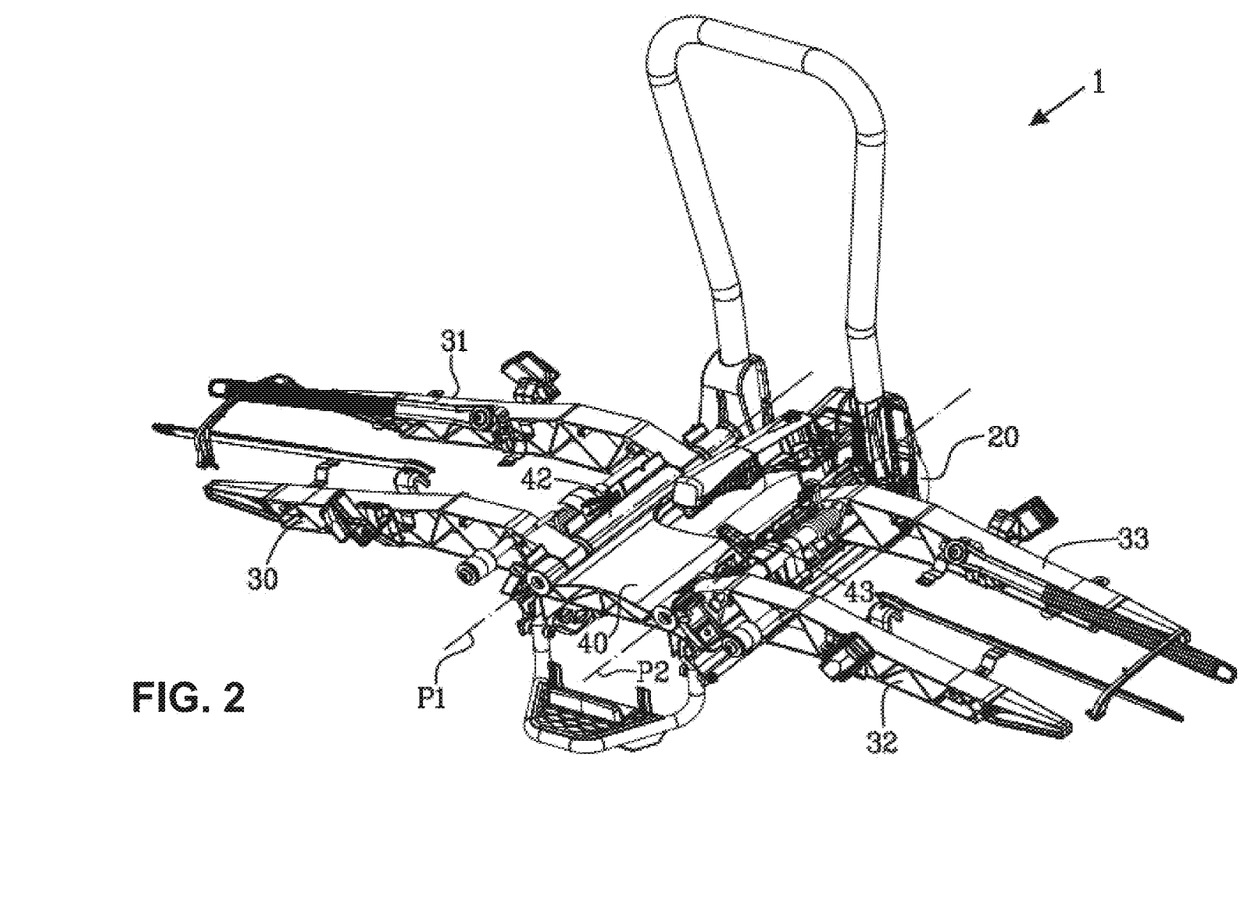
FIG. 2 shows the bike carrier of FIG. 1 without a housing and with the pivot arms exposed.

FIG. 2 shows the bike carrier 2 of FIG. 1 but without the first and the second housing 16, 17. As is noticed, each load receiving section 10, 11 comprises a first and a second pivot arm 30, 31, 32, 33. The first and the second pivot arms 30, 31, 32, 33 of the first and the second load receiving sections 10, 11 are pivotally connected to a base frame 40. The base frame 40 is configured to be mounted to the frame member 20 and functions as a console to the first and the second pivot arms 30, 31, 32, 33 of the first and the second load receiving sections 10, 11. It further bridges the first and the second load receiving sections 10, 11 together in a rigid manner. As is noticed, it bridges directly between two opposing pivot arms 30, 32, i.e. between one pivot arm of the first and the second load receiving sections 10, 11. It should be noted that in other embodiments, the base frame 40 can be mounted directly to the towing bar of the vehicle instead of an intermediate frame member, such as the frame member 20.

The base frame 40 can be provided with two or more pivot arms, advantageously 4 pivot arms as in the shown embodiment. It is suitable to have two opposing pivot arms for each bike intended to be transported with the bike carrier 2. The pivot arms 30, 31, 32, 33 are positioned on opposing sides of the base frame 40, so that the base frame 40 is substantially positioned between the pivot arms and bridges the distance at least between two of the four pivot arms 30, 32, when the pivot arms are in a carrier position, or operative position. The first and the second pivot arms 30, 31 of the first load receiving section 10 are connected to the base frame 40 at a first connection portion 42, while the first and the second pivot arms 32, 33 of the second load receiving section 11 are connected at a second connection portion 43. The base frame 40 may be arranged on a sub frame, which sub frame may comprise a vehicle coupling arrangement for connecting the load carrier to the vehicle.

Figure 3:
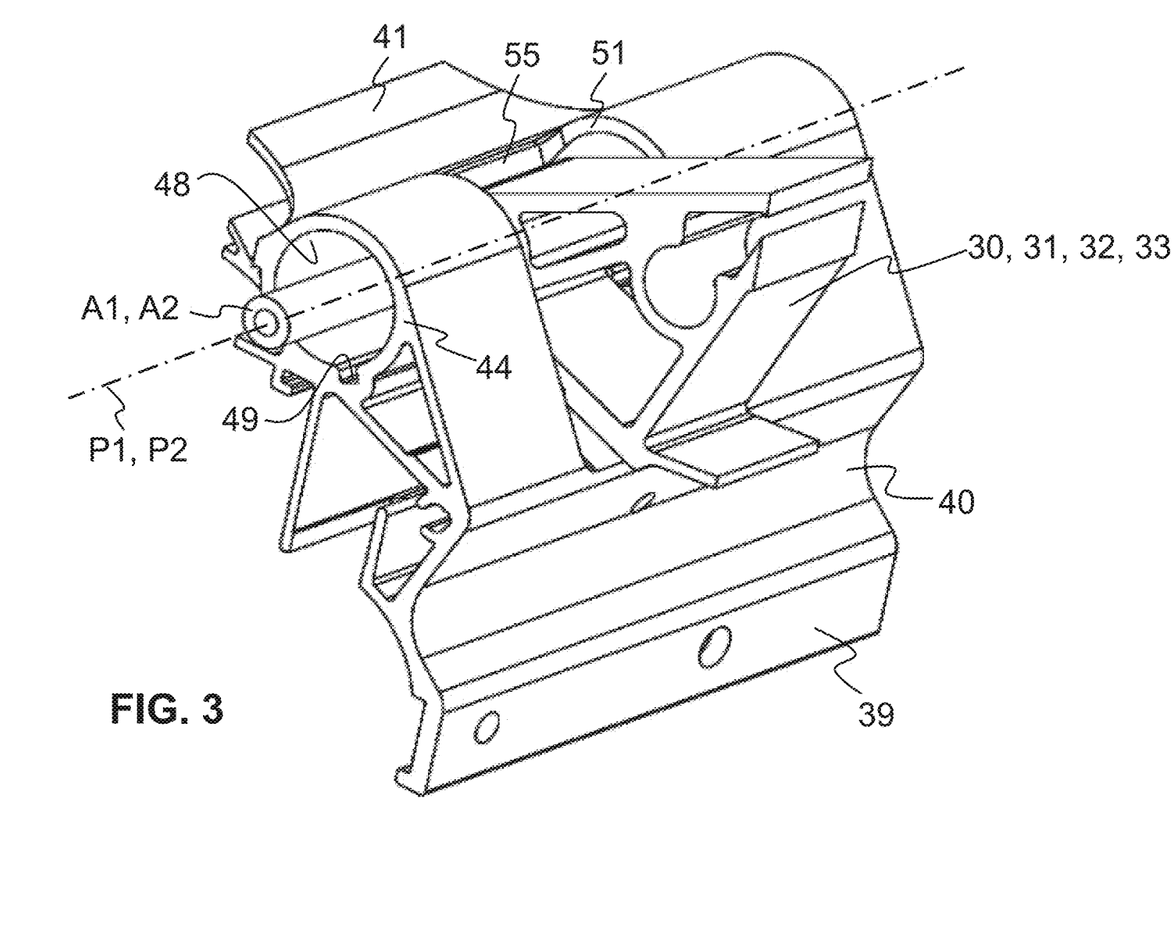
FIG. 3 shows the connection portion of the base frame, or console, to which the pivot arms are connected.

FIG. 3 shows the connection portion 42, 43 of the base frame 40 in greater detail. The base frame 40 comprises a bridging portion 41, bridging between the first and the second load receiving sections 10, 11 and the pivot arms 30, 31, 32, 33 (shown in FIG. 1). The first and the second connection portions 42, 43 of the base frame 40, and the bridging portion 41 are formed in one unitary piece of material, in this case, formed by extruded aluminum. Further associated with each of the first and the second connection portions 42, 43 is a frame member connection portion 39 for connection with the frame member 20. The first and the second frame member connection portions 39, the first and the second connection portions 42, 43 of the base frame 40, and the bridging portion 41 are formed in one unitary piece of material.

The first and the second connection portions 42, 43 comprises a circular cross section forming a tube 44, enveloping an axle A1 to connect the pivot arms 30, 31, 32, 33. A cut outs, or slot, 51 is milled from the base frame 40 so that the axle A1, A2 can be exposed for connection with the pivot arms 30, 31, 32, 33. The cut out 51 comprises a first and a second stop surface 54, 55 which defines an available pivot angle α. The available pivot angle α is in the order of 90 degrees, optionally between 70-120 degrees, and defines the amount of degrees which the pivot arms 30, 31, 32, 33 are permitted to pivot between the carrier position and the storage position. The pivot arms 30, 31, 32, 33 comprises corresponding stop surfaces interacting with the first and the second stop surfaces 54, 55 of the cut out 51 of the base frame 40.

Figure 4:
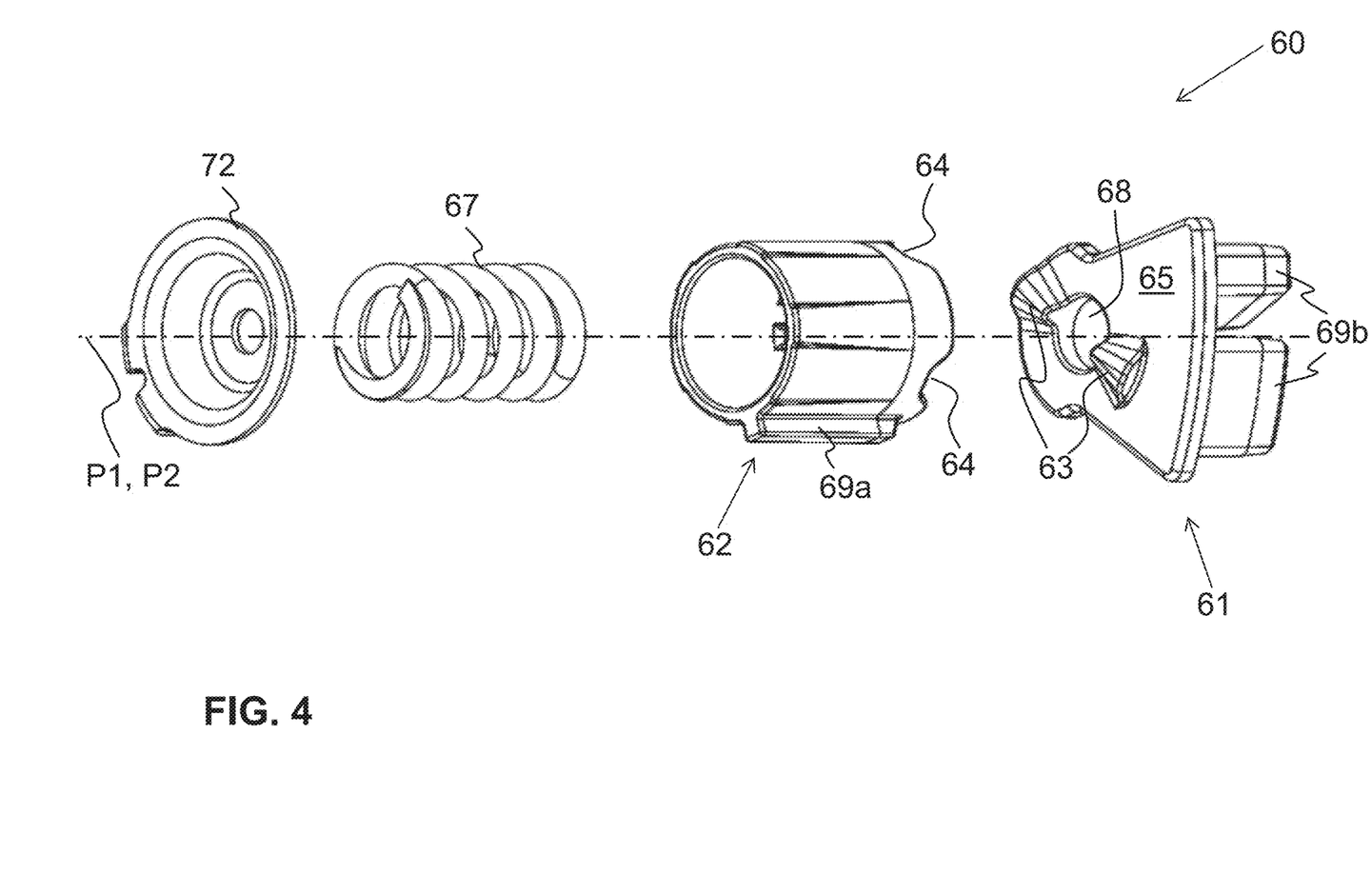
FIG. 4 shows the locking mechanism according to a first embodiment.
Figure 7:
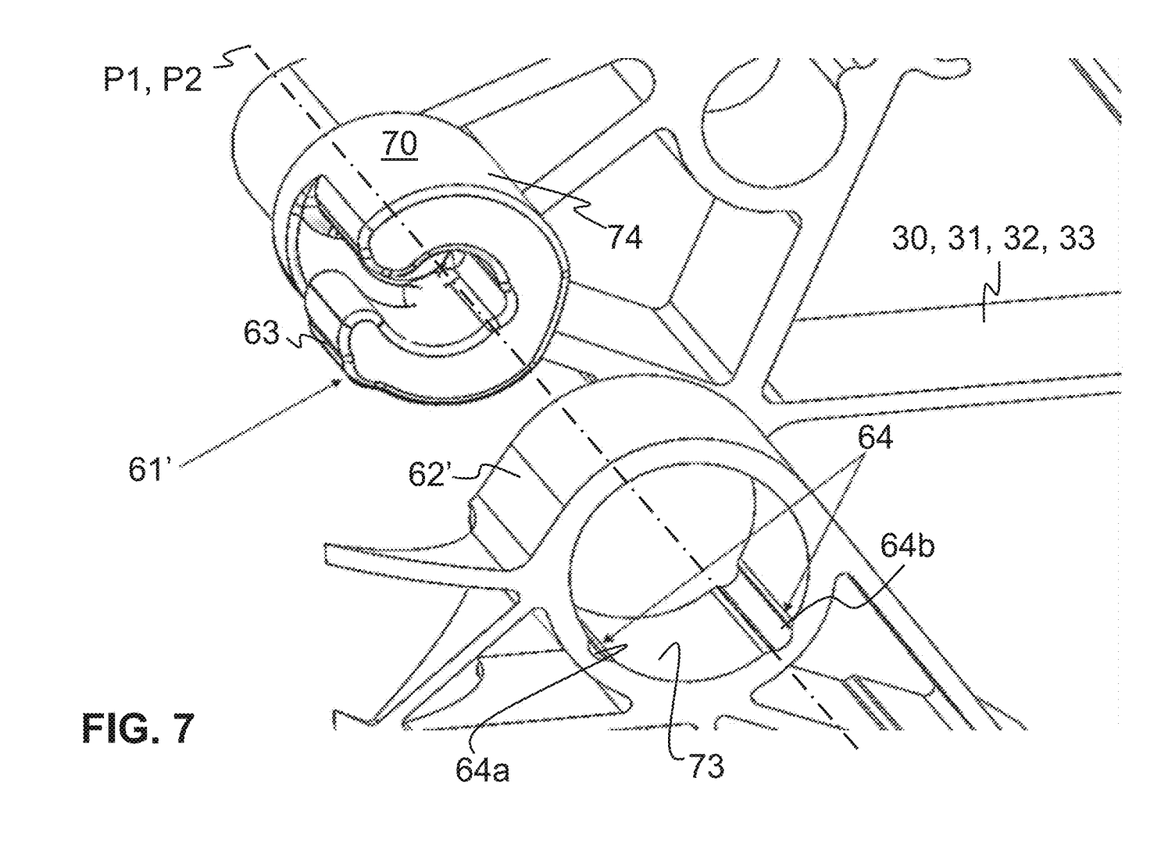
FIG. 7 shows the locking mechanism according to a second embodiment.

In order to secure the at least one pivot arm 30, 31, 32, 33 in the operative position and in the storage position the load carrier further comprises a locking mechanism 60. Thereby, the pivot arm 30, 31, 32, 33 can be locked in the desired position and be prevented from undesirably leaving the desired position. This improves the handling and the comfort of using the load carrier 1, since the pivot arms 30, 31, 32, 33 are prevented from unwantedly unfolding into the operative position when the pivot arms 30, 31, 32, 33 are in the storage position. This also reduces rattle of the load carrier 1 in the operative position, which further improves the user experience of the load carrier. A first embodiment of the locking mechanism is shown in FIG. 4 and a second embodiment of the locking mechanism is shown in FIG. 7. The locking mechanism 60 comprises a first locking member 61 and a second locking member 62. The first and the second locking members 61, 62 are co-axially arranged with the pivot axis P1, P2 and are pivotable in relation to each other around the pivot axis P1, P2 when the at least one pivot arm 30, 31, 32, 33 pivots about the pivot axis P1, P2.

The first locking member 61 or the second locking member 62 is fixed with respect to and pivots synchronously with the at least one pivot arm 30, 31, 32, 33. The other of the first and the second locking member 61, 62 is fixed with respect to the base frame 40. The first and the second locking members 61, 62 are arranged to abut each other such that a friction force is created between the locking members 61, 62. The friction force secures the at least one pivot arm 30, 31, 32, 33 to the base frame 40 in the storage position and/or in the operative position. In order to increase the friction force, the first and the second locking members 61, 62 may be biased towards each other. The mechanical force applied by the means biasing the locking members, which may also be referred to as a biasing force, increases the normal force acting on a contact area between the first and the second locking members 61, 62. Thereby the friction force between the first and the second locking members 61, 62 can be increased by increasing the biasing force. The biasing force which biases the locking members 61, 62 towards each other can be chosen in a range which allows the friction force to secure the pivot arm 30, 31, 32, 33 in the storage and/or operating position, but allows a user to easily move the pivot arm 30, 31, 32, 33 from either position by applying an increased force overcoming the friction force and/or the mechanical force. The biasing means may e.g. be a spring, wherein a spring rate of the spring can be chosen in a range which allows the friction force to secure the pivot arm 30, 31, 32, 33 in the storage and/or operating position, but allows a user to easily move the pivot arm 30, 31, 32, 33 from either position by applying an increased force overcoming the friction force and/or the mechanical force.

The first locking member 61 may further comprise at least one protrusion 63 and the second locking member 62 may further comprise at least one groove 64. The shape of the at least one protrusion 63 and the at least one groove 64 correspond, such that the at least one protrusion 63 can be received by the at least one groove 64. Thereby, the pivot arm 30, 31, 32, 33 can further be secured to the base frame 40 by a form fit connection. The form fit connection mechanically blocks a rotation of the locking members 61, 62 in relation to each other.

The second locking member 62 may comprise a first groove 64a arranged to receive the at least one protrusion 63 when the at least one pivot arm 30, 31, 32, 33 is in the operative position. The second locking member 62 may further comprise a second groove 64b arranged to receive the protrusion 63 when the at least one pivot arm 30, 31, 32, 33 is in the storage position. The second locking member 62 may further comprise both a first groove 64a arranged to receive the at least one protrusion 63 when the at least one pivot arm 30, 31, 32, 33 is in the operative position and a second groove 64b arranged to receive the protrusion 63 when the at least one pivot arm 30, 31, 32, 33 is in the storage position. Thereby the pivot arm can be secured the form fit connection between the at least one protrusion 63 and the at least one groove 64 in both the operative position and in the storage position.

The base frame 40 may further comprise fixation means for rotatably fixing the first or the second locking member 61, 62 in relation to the base frame 40, when the locking member 61, 62 is arranged on the base frame 40. The fixation means may e.g. be contour of the base frame 40 creating a form fit connection with corresponding fixation means on the first or the second locking member 61, 62, such as a notch 49 arranged on the inner circumferential surface 48 of the tube 44 and extending in the longitudinal direction of the pivot axis P1, P2. The longitudinal direction of the pivot axis P1, P2 may herein also be referred to as an axial direction.

FIG. 4 shows the locking mechanism 60 according to a first aspect of embodiments. According to the first aspect of embodiments, the first and the second locking member 61, 62 are arranged adjacent to each other in the axial direction. Each of the first and the second locking members 61, 62 may comprises a surface 65, 66 perpendicular to the pivot axis P1, P2. The first and the second locking members 61, 62 are arranged on the base frame 40 and on the pivot arm 30, 31, 32, 33, such that the surfaces 65, 66 abut each other. Thereby, the friction force securing the at least one pivot arm 30, 31, 32, 33 in the storage position and/or the operational position is created between the surface 65 of the first locking member 61 and the surface 66 of the second locking member 62.

Figure 5:
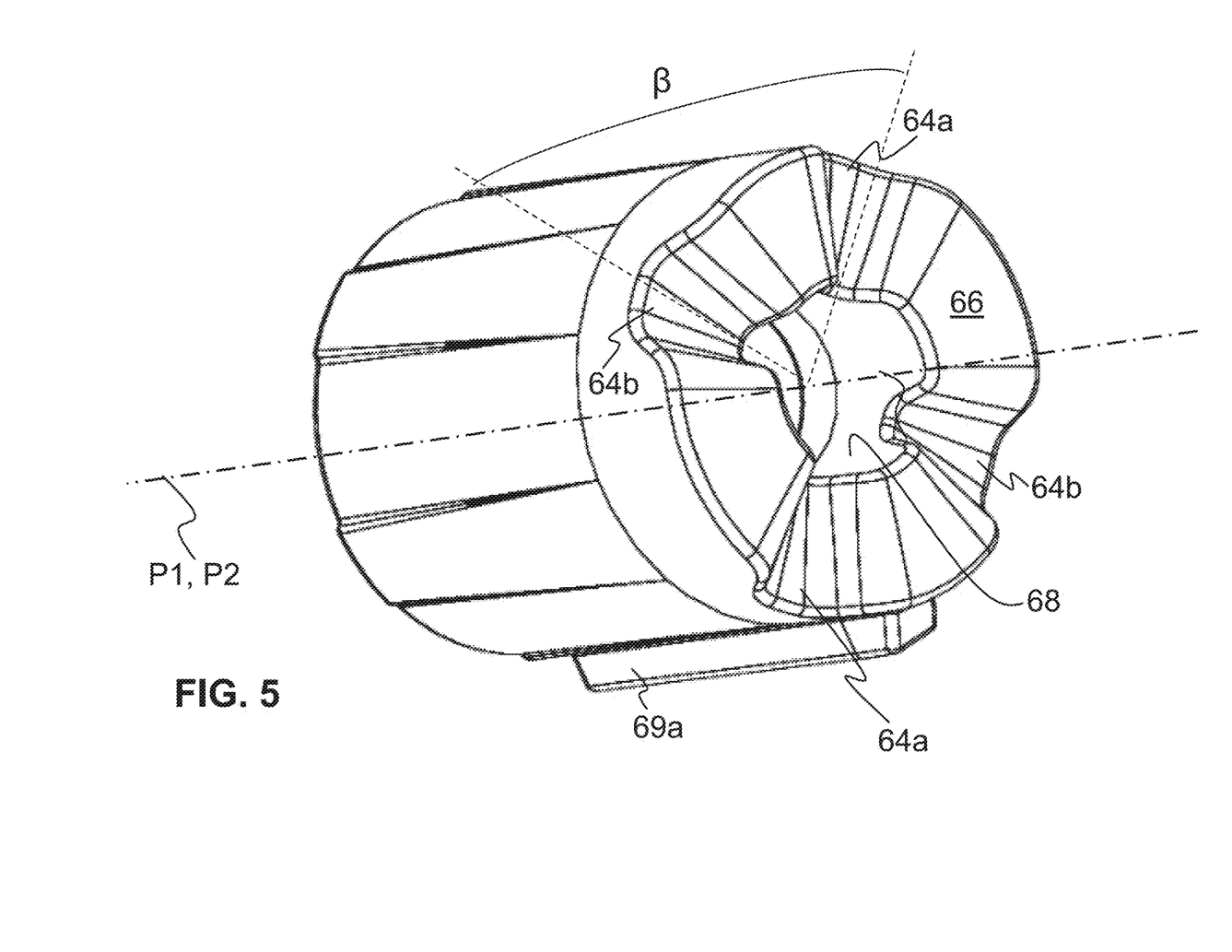
FIG. 5 shows the second locking member according to the first embodiment.

The at least one protrusion 63 may protrude from the surface 65 of the first locking member 61 and the at least one groove 64 may be arranged on the second locking member 62. According to the embodiment shown in FIG. 4, the first locking member 61 comprises two protrusions 63 arranged on the surface 65. As is further shown in FIG. 5, the second locking member 62 comprises four grooves 64a, 64b arranged on the surface 66 facing the surface 65 of the first locking member 61. The two grooves 64a are arranged to receive the two protrusions 63 of the first locking member 61 in the operative position of the pivot arm 30, 31, 32, 33 and the two grooves 64b are arranged to receive the two protrusions 63 in the storage position of the pivot arm 30, 31, 32, 33. The angle β between the grooves 64a and the grooves 64b is defined by the amount of degrees which the pivot arms 30, 31, 32, 33 are permitted to pivot between the operating position and the storage position and thus corresponds to the available pivot angle α. Hence, the angle β is also in the order of 90 degrees, optionally between 70-120 degrees. As can be seen in FIGS. 4 and 5, the protrusions 63 and grooves 64 arranged on the surfaces 65, 66 give the locking members 61, 62 a cam gear profile which provides the pivot arm with a snap locked position in both the storage position and the operating position.

The locking mechanism 60 may further comprise a biasing means 67, which biasing means 67 is arranged to bias the first and the second locking members 61, 62 towards each other in the axial direction. By biasing the first and the second locking members 61, 62 towards each other the friction between the first and the second locking member 61, 62, and thereby the force securing the pivot arm 30, 31, 32, 33, can be increased. The biasing force from the biasing means 67 further causes the at least one protrusion 63 to snap into the at least one groove 64 when the pivot arm 30, 31, 32, 33 has been pivoted to either the storage position or the operating position. The lock mechanism 60 may further permit the pivot arm 30, 31, 32, 33 to be positioned and locked in an intermediate position. An intermediate position may be useful if a pivot arm 30, 31, 32, 33 is temporarily displaced, e.g. to adjust something on the vehicle or to load the vehicle. Hence the locking mechanism 60 may be provided with a groove and/or a cooperating protrusion defining an intermediate position. In order to move the pivot arm 30, 31, 32, 33 from the secured position the biasing force and the friction force between the surfaces 65, 66 of the locking members 61, 62 has to be overcome. It has been found advantageous to use a coil spring as biasing means 67, since coil springs are commercially available and the spring rate of the coil spring can easily be adapted to provide the necessary biasing force for securing the pivot arm by replacing the coil spring with a different commercially available coil spring. Thereby a cost effective locking mechanism can be provided. The locking mechanism 60 further comprises a counter force element for the biasing means 67 arranged at the opposite end of the biasing means 67 in an axial direction. The counter force element may e.g. be integrated in the base frame 40 or be in the shape of a washer 72 arranged on the pivot axle A1, A2 by means of a fastening means. The fastening means may e.g. be a bolt threaded into a threaded hole in the pivot axle A1, A2 or a locking ring inserted into a circumferential groove in the pivot axle A1, A2.

The first and the second locking member 61, 62 may each comprise a longitudinal through hole 68. The through hole 68 allows the locking members 61, 62 to be arranged on the pivot axle A1, A2. This may also be referred to as the first and the second locking members 61, 62 being formed as sleeves covering the pivot axis P1, P2. Thereby, the locking members 61, 62 can be arranged on the at least one pivot arm 30, 31, 32, 33 and/or the base frame 40 and can act as a centering and a sliding bearing for the pivot axle A1, A2 in the pivot arm 30, 31, 32, 33 and the base frame 40.

The first and the second locking member 61, 62 can further comprise fixation means 69 adapted to prevent rotation of the locking members 61, 62 in relation to the base frame 40 and/or the at least one pivot arm 30, 31, 32, 33 which the first and the second locking members 61, 62 are fixed with respect to. The fixation means 69 may e.g. be a ridge 69a arranged in the axial direction of the locking member and adapted to be inserted in the longitudinal notch 49. The fixation means 69 may however also be any other means 69b creating a form fit connection with the at least one pivot arm 30, 31, 32, 33 or the base frame 40.

Although only one locking mechanism 60 is disclosed in FIG. 4, each pivot arm 30, 31, 32, 33 of the load carrier 1 may comprise a plurality of locking mechanisms 60, such as e.g. two locking mechanisms 60 positioned on opposing sides of the pivot arm 30, 31, 32, 33 in an axial direction.

Figure 6:
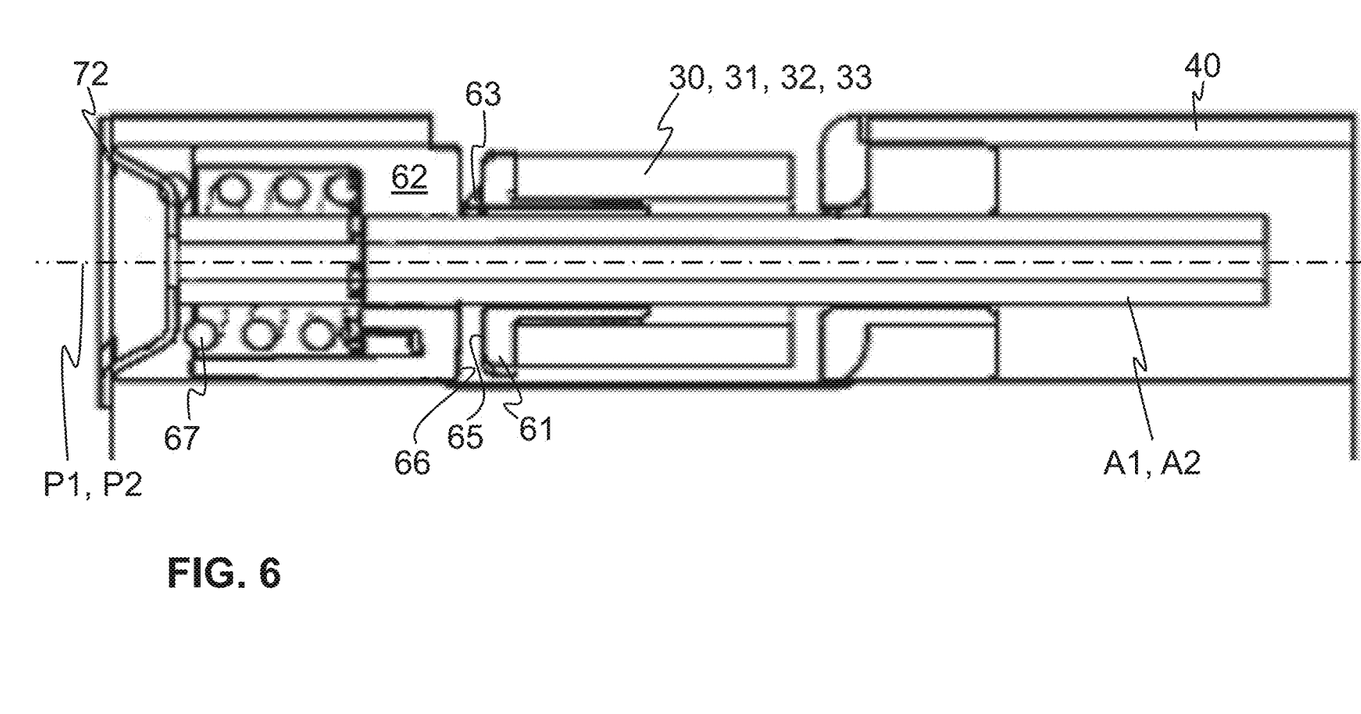
FIG. 6 shows the locking mechanism according to the first embodiment in an assembled state.

FIG. 6 shows a cross section of the locking mechanism 60 according to the first embodiment in an assembled state with the base frame 40 and a pivot arm 30, 31, 32, 33. The first locking member 61 is inserted into the pivot arm 30, 31, 32, 33 and rotatably fixed to the pivot arm by fixation means, such that the surface 65 and the protrusion 63 protrudes from the pivot arm 30, 31, 32, 33 in the axial direction. The second locking member 62 is inserted into the base frame 40, such as e.g. into the tube 44 of the base frame 40, and rotatably fixed to the base frame 40 by fixation means. The second locking member 62 is arranged such that the surface 66 of the second locking member is facing the surface 65 of the first locking member 61. A pivot axle A1, A2 is inserted through the axial through holes 68 of the locking members 61, 62, such that the first and second locking members are slidably arranged on the pivot axle A1, A2. Thereby a pivotal connection between the pivot arm 30, 31, 32, 33 and the base frame 40 can be created. The coil spring 67 is positioned over the pivot axle A1, A2 between the second locking member 62 and a counter force element 69 fixed to the base frame 40 or the pivot axle A1, A2. The coil spring is compressed between the second locking member 62 and the counter force element, such that the force of the spring displaces the second locking member 62 in the axial direction towards the first locking member 61 to allow the surface 65 of the first locking member 61 to abut the surface 66 of the second locking member 62. Thereby, a friction is created between the surfaces 65 and 66 which secures the pivot arm 30, 31, 32, 33 to the base frame 40 in the storage position and/or in the operating position. Although not shown in FIG. 6, it shall be understood that the pivot arm may comprise a further locking mechanism on the opposing side of the pivot arm 30, 31, 32, 33 from the disclosed locking member 61.

FIG. 7 shows the locking mechanism 60 according to a second aspect of embodiments herein. According to the second aspect, the first and the second locking members 61', 62' may be aligned in a radial direction perpendicular to the axial direction. The second locking member 62' can be drum shaped and the first locking member 61, which is fixed to the pivot arm 30, 31, 32, 33, can be rotatably arranged inside the second locking member 62'. The second locking member 62' may be a drum shaped portion of the base frame 40, such as e.g. the tube 44 of the base frame 40. The first and second locking members 61', 62' may be biased towards each other in the radial direction. The first locking member 61' may comprise a flexible main body 70 having a cylindrical shape. The flexible main body 70 of the first locking member 61' may have a larger dimension than the inner dimension of the second locking member in the radial direction, such that the first locking member 61' acts as a torsional spring biasing the first locking member 61' towards the second locking member 62'. Hence, the material of the first locking member 61' is used to create the biasing force biasing the first and the second locking members together. Before inserting the first locking member 61' into the drum shaped second locking member, the flexible main body 70 of the first locking member 61' is compressed. Thereafter, the first locking member can be inserted into the drum shaped second locking member 62'. When the flexible main body 70 of the first locking member 61' recovers it shape, it expands inside the second locking member 62' and creates a normal force pushing against the inner circumferential surface 73 of the drum shaped second locking member 62'. The normal force increases the friction between the two locking members 61', 62', which secures the pivot arm 30, 31, 32, 33 fixed to the first locking member 61' in the storage position and/or the operational position. The at least one groove 64 may be arranged on the inner circumferential surface 73 of the drum shaped second locking member 62' and the at least one protrusion 63 may be arranged on an outer circumferential surface 74 of the first locking member 61', in order to create the snap lock positioning of the pivot arm pivot arm 30, 31, 32, 33 in the storage and the operational position as discussed above with respect to the first embodiment.

As can be seen in FIG. 7, the pivot arm 30, 31, 32, 33 is located in the storage position and secured in the position by the friction force between the first locking member 61' arranged inside the second locking member 62' and the protrusion 63 being received in the groove 64b. The angle between the groove 64a and the groove 64b corresponds to the angle β as defined for the first embodiment in FIG. 5.

Figure 8:
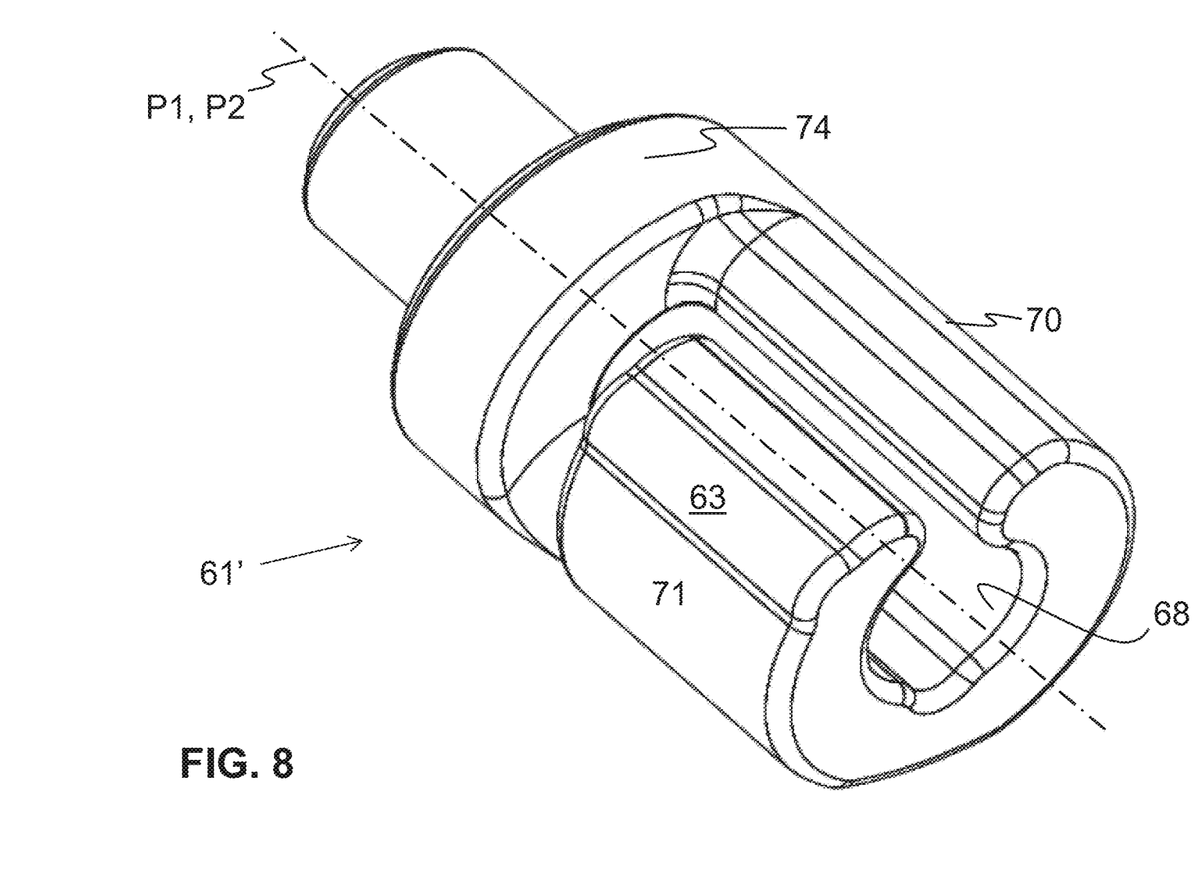
FIG. 8 is a perspective view of the first locking member according to the second embodiment in more detail.

FIG. 8 shows the first locking member 61' according to the second embodiment in more detail. As can be seen, the first locking member 61' may comprise a curved arm 71 extending from the main body 70 of the first locking member 61' in a circumferential direction of the first locking member 61'. The curved arm 71 is arranged to biasedly abut the inner circumferential surface of the second locking member 62', when the first locking member 61' is arranged inside the second locking member 62'. The protrusion 63 may protrude from a free end of the curved arm 71. The dimension of the curved arm 71 may be such that the curved arm 71 is pretensionally arranged, i.e. is compressed before mounting, within the second locking member 62'. Thereby the curved arm 71 of the first locking member 61' acts as a torsional spring biasing the first locking member 61' towards the second locking member 62'.

The first and the second locking members 61', 62' according to the second aspect may also comprise fixation means 69 adapted to prevent rotation of the locking members 61', 62' in relation to the base frame 40 and/or the pivot arm 30, 31, 32, 33 which the first and the second locking members 61', 62' are arranged on. The fixation means may be any of the fixation means as discussed above in relation to the first embodiment.

According to an aspect herein, the at least one protrusion 63 and the at least one groove 64 may comprise corresponding inclined surfaces. The inclination causes a smooth displacement of the protrusion from the surface 66 to the bottom surface of the groove 64 which allows the at least one protrusion 63 to slide out of the groove 64 when an external force is applied to the at least one pivot arm 30, 31, 32, 33 in order to move the pivot arm 30, 31, 32, 33 from the storage position or the operative position. The inclination is preferably selected such that when a user has applied a force to move the pivot arm 30, 31, 32, 33 out of the groove 64b in the storage position, the pivot arm 30, 31, 32, 33 can move from the storage position to the operational position solely by a gravitational force acting on the pivot arm 30, 31, 32, 33 allow the at least one protrusion 63 to reach the groove 64a corresponding to the operational position and snapping into a secured position, without a user having to apply an additional force.

Although the grooves 64a, 64b are described herein as being arranged to receive the protrusion 63 in the storage and/or the operational position, it should be understood that positions can in a similar manner be defined by one or more protrusions 63 and the groove 64 could receive the protrusion in the storage and/or operational positions.

The first and the second locking members 61, 62 can advantageously be manufactured from a polymer composition such as polypropylene, polyethylene, acrylonitrile butadiene styrene (ABS), polyurethane or mixtures thereof.

For the purpose of orientation the following axis and directions are used herein; a vertical X-axis corresponding to the height of the load carrier 1; a horizontal Y-axis corresponding to the elongation, or length, of the load carrier 1 and; a Z-axis corresponding to the width of the load carrier 1. The X, Y and Z-axes are perpendicular to each other.

What is claimed is:

1. A load carrier for a vehicle adapted to be mounted on said vehicle for transporting a load, said load carrier comprising:
   at least one pivot arm being pivotably connected about a pivot axis to a base frame at a pivot connection portion, said at least one pivot arm being pivotable between an operative position and a storage position, said load carrier being adapted to carry said load when said at least one pivot arm being positioned in said operative position,
   wherein said load carrier comprises a locking mechanism for securing said at least one pivot arm in said operative position or in said storage position, said locking mechanism comprising a first locking member and a second locking member co-axially arranged with said pivot axis and pivotable in relation to each other around said pivot axis when said at least one pivot arm pivots about said pivot axis, such that a friction force or a mechanical force between the first locking member and the second locking member secures said at least one pivot arm in said operative position or in said storage position,
   wherein the first and second locking members are biased towards each other,
   wherein said first locking member comprises at least one protrusion, and said second locking member comprises at least one groove, such that the second locking member comprises a first groove arranged to receive the at least one protrusion when the at least one pivot arm is in the operative position, and a second groove arranged to receive the protrusion when the at least one pivot arm is in the storage position,
   wherein the at least one protrusion and the at least one groove comprise corresponding inclined surfaces, which inclination allows the at least one protrusion to slide out of the groove when an external force is applied to the at least one pivot arm in order to move the pivot arm from the storage position to the operative position, and
   wherein said base frame comprises a stop surface which defines a pivot angle of said at least one pivot arm between said operative position and said storage position.

2. The load carrier according to claim 1, wherein the first locking member or the second locking member is fixed with respect to and pivots synchronously with said at least one pivot arm, and wherein the other of the first and the second locking member is fixed with respect to the base frame.

3. The load carrier according to claim 1, wherein said first and second locking members are arranged adjacent to each other in an axial direction.

4. The load carrier according to claim 1, wherein said locking mechanism comprises a biasing means, which biasing means is arranged to bias the first and the second locking members towards each other in the axial direction.

5. The load carrier according to claim 1, wherein each of the first and the second locking members comprises a surface perpendicular to the pivot axis, wherein the at least one protrusion protrudes from the surface of the first locking member and the at least two grooves are arranged on the surface of the second locking member.

6. The load carrier according to claim 1, wherein the second locking member is drum shaped and the first locking member is rotatably arranged inside the second locking member and said first and second locking members are biased towards each other in a radial direction.

7. The load carrier according to claim 6, wherein the first locking member comprises a flexible main body having a cylindrical shape, and wherein the at least two grooves are arranged on an inner circumferential surface of the second locking member and the at least one protrusion is arranged on an outer circumferential surface of the first locking member.

8. The load carrier according to claim 7, wherein the flexible main body of the first locking member has a larger dimension than the inner dimension of the second locking member in the radial direction, such that the first locking member acts as a torsional spring biasing the first locking member towards the second locking member.

9. The load carrier according to claim 6, wherein the first locking member comprises a curved arm extending from the main body of the first locking member in a circumferential direction of the first locking member and biasedly abutting the inner circumferential surface of the second locking member, wherein the protrusion protrudes from the free end of said curved arm, and wherein the dimension of the curved arm is such that the curved arm is pretensionally arranged within the second locking member, such that the curved arm of the first locking member acts as a torsional spring biasing the first locking member towards the second locking member.

10. The load carrier according to claim 6, wherein the second locking member is a drum shaped portion of the base frame or the at least one pivot arm.

11. The load carrier according to claim 1, wherein said first and second locking members comprise fixation means adapted to prevent rotation of the locking members in relation to the base frame or the at least one pivot arm which the first and the second locking members are fixed with respect to.

12. The load carrier according to claim 1, wherein said at least one pivot axis is formed by a separate pivot axle, or by an axle formed by said base frame, and wherein the first and the second locking members are formed as sleeves covering the at least one pivot axis.

13. The load carrier according to claim 1, wherein the at least one protrusion and the at least one groove comprise a cam gear profile configured to provide the at least one pivot arm with a snap locked position in both the storage position and the operative position.

14. The load carrier according to claim 1, wherein the at least one pivot arm moves from the storage position to the operative position by gravity acting on the at least one pivot arm.

15. A load carrier for a vehicle adapted to be mounted on said vehicle for transporting a load, said load carrier comprising:
at least one pivot arm being pivotably connected about a pivot axis to a base frame at a pivot connection portion, said at least one pivot arm being pivotable between an operative position and a storage position, said load carrier being adapted to carry said load when said at least one pivot arm being positioned in said operative position,
wherein said load carrier comprises a locking mechanism for securing said at least one pivot arm in said operative position or in said storage position, said locking mechanism comprising a first locking member and a second locking member axially arranged with said pivot axis and pivotable in relation to each other around said pivot axis when said at least one pivot arm pivots about said pivot axis, such that a friction force or a mechanical force between the first locking member and the second locking member secures said at least one pivot arm in said operative position or in said storage position,
wherein said base frame comprises a stop surface which defines a pivot angle of said at least one pivot arm between said operative position and said storage position.

16. The load carrier according to claim 15, wherein said base frame comprises a second stop surface which defines said pivot angle.

17. The load carrier according to claim 15, wherein said pivot angle is between 70 degrees and 120 degrees.

18. The load carrier according to claim 15, wherein said at least one pivot arm comprises a corresponding stop surface configured to interact with said stop surface of said base frame.

* * * * *